(12) United States Patent
Chen

(10) Patent No.: US 10,902,645 B2
(45) Date of Patent: Jan. 26, 2021

(54) DYNAMIC STAMP TEXTURE FOR DIGITAL PAINTBRUSH

(71) Applicant: Adobe Inc., San Jose, CA (US)

(72) Inventor: Zhili Chen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/257,862

(22) Filed: Jan. 25, 2019

(65) Prior Publication Data
US 2020/0242814 A1 Jul. 30, 2020

(51) Int. Cl.
*G06T 11/00* (2006.01)
*G06T 7/41* (2017.01)
*G06F 3/0354* (2013.01)

(52) U.S. Cl.
CPC ........ *G06T 11/001* (2013.01); *G06F 3/03545* (2013.01); *G06T 7/41* (2017.01)

(58) Field of Classification Search
CPC ....... G06T 11/001; G06T 7/41; G06T 11/203; G06T 11/20; G06T 2219/2012; G06F 3/03545; G06F 3/016; G06F 3/04883; G06F 2203/04104; G06F 3/0354; G06F 2203/04105; G06F 16/5838
See application file for complete search history.

(56) References Cited

U.S. PATENT DOCUMENTS

| 5,835,086 A * | 11/1998 | Bradstreet | G06T 11/001 345/581 |
| 2007/0216684 A1* | 9/2007 | Hsu | G06T 11/60 345/441 |
| 2007/0268302 A1* | 11/2007 | Hsu | G06T 11/001 345/589 |

* cited by examiner

*Primary Examiner* — Xilin Guo
(74) *Attorney, Agent, or Firm* — SBMC

(57) ABSTRACT

In implementations of dynamic texture for a digital paintbrush one or more computing devices implement a digital paintbrush module to receive a stroke property of a stroke from an input device. The digital paintbrush module determines a weight to apply to a texture image channel that represents an attribute of the digital paintbrush. A magnitude of the weight defines a significance of the attribute relative to another attribute of the digital paintbrush which is represented by another texture image channel. A texture stamp of the digital paintbrush is generated by combining the texture image channel with the other texture image channel. The texture stamp is used to render the stroke of the paintbrush in a user interface of a display device based on the received stroke property.

20 Claims, 8 Drawing Sheets

300

302
Receive an input describing at least one stroke property of a stroke of a digital paintbrush

304
Determine a weight to apply to at least one texture image channel based on the at least one stroke property, the at least one texture image channel representing an attribute of the digital paintbrush

306
Adjust the attribute of the digital paintbrush by applying the weight to the at least one texture image channel

308
Generate a texture stamp of the digital paintbrush by combining the at least one texture image channel with at least one additional texture image channel representing an additional attribute of the digital paintbrush

310
Render the stroke for display in a user interface using the generated texture stamp

*Fig. 3*

DYNAMIC STAMP TEXTURE FOR DIGITAL PAINTBRUSH

BACKGROUND

Digital painting is a type of content creation that simulates conventional painting by rendering strokes of a virtual paintbrush in a user interface displayed by a display device. In some conventional digital painting systems, a computing device receives an input describing a stroke path of an input device, and the computing device renders a digital paintbrush stroke by applying a stamp texture along the stroke path. The stamp texture generally represents a property of physical painting, e.g., bristles of a physical paintbrush, and thus application of the stamp texture generates a digital paintbrush stroke intended to simulate a physical paintbrush stroke.

However, rendering digital paintbrush strokes using this conventional approach often oversimplifies physical painting and thus fails to reflect variables such as stroke pressure, stroke direction, paintbrush orientation, and interaction of bristles with a paint substrate such as a canvas. Conventional techniques also fail to reflect changes in these variables and are limited to rendering digital paintbrush strokes using a static stamp texture pattern. Although some systems allow for optional "jittering" which randomly rotates and/or resizes the stamp texture along the stroke path, these conventional systems do not change the stamp texture pattern. Specifically, conventional techniques do not change or modify the stamp texture pattern when rendering optional "jittering" because this feature rotates the stamp texture pattern and/or resizes the stamp texture pattern, but the stamp texture pattern remains static and unchanged. As a result of these shortcomings, digital paintbrush strokes rendered using this conventional approach often appear unrealistic.

Another conventional approach to digital painting simulates individual bristles of a physical paintbrush such that each of the simulated bristles interacts with virtual paint and a virtual canvas. A computing device can use information from this three-dimensional simulation to render digital paintbrush strokes. Although individual bristle simulation can reflect more variables than the conventional stamp texture rendering approach, this type of simulation is computationally expensive to the extent that it is not viable for most computing devices.

Even when used on computing devices with sufficient resources to support three-dimensional modeling, the individual bristle simulation systems overwhelm computational capabilities in many common use scenarios such as fast paintbrush strokes. Thus, these conventional systems often place a limit on paintbrush stroke speed which is frustrating to users. Other disadvantages of three-dimensional modeling approaches include problems with consistency and repeatability. For example, a user may observe that a particular manipulation of an input device caused a digital stroke to be rendered with a desirable feature; however, the user is often unable to reproduce the desirable feature even when repeatedly performing the same particular manipulation of the input device. In another example, the user may observe that a certain combination of input device manipulations and system settings produces a desirable result in one content project, but the same certain combination of input device manipulations and system settings does not produce the desirable result in another similar content project.

SUMMARY

Systems and techniques are described for a dynamic stamp texture for a digital paintbrush. A computing device implements a digital paintbrush system which receives input data that describes a stroke property of a stroke of a digital paintbrush. The digital paintbrush system determines a weight to apply to a texture image channel based on the stroke property of the stroke. The texture image channel represents an attribute of the digital paintbrush and a magnitude of the weight defines a relative significance of the attribute based on the received stroke property. The digital paintbrush system applies the weight to the texture stamp channel and generates a texture stamp of the digital paintbrush by combining the texture stamp channel with another texture stamp channel which represents another attribute of the digital paintbrush. The digital paintbrush system uses the generated texture stamp to render the stroke in a user interface of a display device.

In the techniques described herein, the texture stamp is dynamically adjusted by adjusting the magnitude of the weight applied to the texture image channel in response to receiving input data describing a change to the stroke property or describing another stroke property of the stroke of the digital paintbrush. For example, the digital paintbrush system changes a pattern of the texture stamp used to render digital paint strokes in real-time based on input data describing changes in stroke pressure, direction, velocity, contact angle, etc. Thus, the digital paintbrush system renders the stroke in the user interface dynamically in response to the received input data to realistically simulate a physical paintbrush stroke.

In this way, the digital paintbrush system provides paint simulation functionality without the computational cost of three-dimensional paintbrush simulation, enabling the digital paintbrush system to be used to provide paint simulation functionality on low-resource computing devices such as mobile devices. The described systems and techniques improve digital painting technology by changing the texture stamp based on received input data in real-time, and using the dynamic texture stamp to render strokes of digital paint. Thus, the digital paintbrush system improves digital painting technology by rendering realistic digital paint strokes consistently and without limits on user inputs such as stroke speed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which an attribute of a digital paintbrush is adjusted based on at least one stroke property of a stroke of the digital paintbrush.

DETAILED DESCRIPTION

Overview

Figure 1:
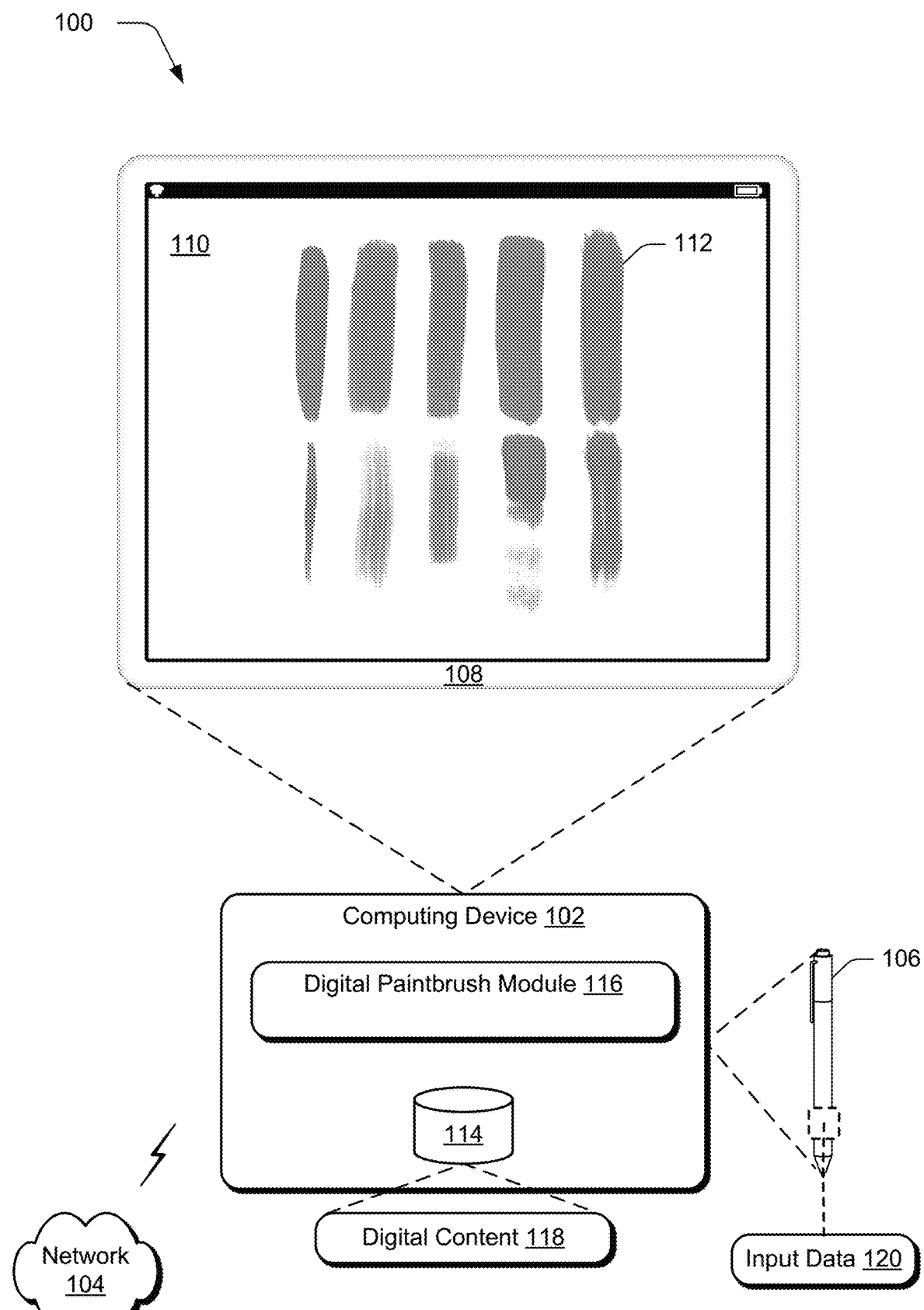
FIG. 1 is an illustration of an environment in an example implementation that is operable to employ digital systems and techniques as described herein.

Digital painting is a type of content creation that simulates physical painting by rendering strokes of a virtual paintbrush in a user interface. In some conventional systems, a computing device receives an input describing a stroke path of an input device, and the computing device renders a digital paintbrush stroke by applying a stamp texture along the stroke path. However, digital paintbrush strokes rendered using these conventional techniques often appear unrealistic because the techniques fail to reflect variables such as stroke pressure, stroke direction, paintbrush orientation, and interaction of bristles with a paint substrate such as a canvas. Conventional techniques also fail to reflect changes in these variables and are limited to rendering digital paintbrush strokes using a static stamp texture pattern. Although some systems allow for optional "jittering" which randomly rotates and/or resizes the stamp texture pattern along the stroke path, these conventional systems do not change the stamp texture pattern.

Another conventional approach to digital painting simulates individual bristles of a physical paintbrush such that each of the simulated bristles interacts with virtual paint and a virtual canvas. A computing device can use information from this three-dimensional simulation to render digital paint brush strokes. Although individual bristle simulation can reflect more variables than the conventional stamp texture rendering approach, this type of simulation is computationally expensive to the extent that it is not viable for most computing devices. Even when used on computing devices with sufficient resources to support three-dimensional modeling, the individual bristle simulation systems overwhelm computing system resources in many common use scenarios such as in response to fast paintbrush strokes. Thus, these conventional systems often place a limit on paintbrush stroke speed which is frustrating and unnatural to users. Other shortcomings of three-dimensional modeling approaches include problems with consistency and repeatability. For example, in conventional techniques, a user may produce a digital paint output in response to a specific set of inputs, but the user may not be able to reproduce the digital paint output even in response to the same specific set of inputs. Individual bristle simulation systems also have limited interoperability with other digital paint systems and require system-specific accessories such as input devices which are not compatible with other digital paint systems.

Systems and techniques are described for a dynamic stamp texture for a digital paintbrush. A computing device implements a digital paintbrush system which includes a channel weight module, a stamp composition module, and a rendering module. The channel weight module is implemented to receive input data, e.g., from an input device, describing a stroke property of a stroke of a digital paintbrush such as a stroke pressure, a stroke velocity, a stroke direction, and an orientation of the input device.

The digital paintbrush system determines a weight to apply to a texture image channel based on the received stroke property of the stroke. The texture image channel represents an attribute of the digital paintbrush such as a normal, smooth, or rough version of a stamp texture of the digital paintbrush. A magnitude of the weight defines a relative significance of the attribute based on the stroke property. Thus, changes in received input data can be reflected as changes in the magnitude of the weight, and the relative significance of the attribute can be changed dynamically based on the input data.

The channel weight module is implemented to apply the determined weight to the texture stamp channel, and the stamp composition module is implemented to generate a texture stamp of the digital paintbrush by combining the texture stamp channel with another texture stamp channel which represents another attribute of the digital paintbrush. In this manner, the texture stamp of the digital paintbrush can be generated dynamically by combining weighted attributes of the digital paintbrush represented by the texture stamp channels where the weight applied to each texture stamp channel defines a relative significance of the attribute represented by the texture stamp channel based on the received input data.

The rendering module is implemented to render strokes of digital paint in a user interface of a display device using the generated texture stamp. The texture stamp is dynamically adjusted by adjusting the magnitude of the weight applied to the texture image channel in response to receiving input data describing a change to the stroke property or describing another stroke property of the stroke of the digital paintbrush. As a result, the digital paintbrush system provides dynamic paint simulation functionality based on received input data without the computational cost of three-dimensional paintbrush simulation.

In one example, the texture image channel can be implemented as an RGB channel of a stamp texture image, and using existing RGB channels for the texture image channels allows the systems and techniques described to be implemented in existing digital painting systems. Thus, by changing weights applied to RGB channels in real-time and dynamically combining the RGB channels as a texture stamp, the digital paintbrush system may be used to provide paint simulation functionality on low-resource computing devices such as mobile devices. The described systems and techniques improve digital painting technology by changing the texture stamp based on received input data in real-time, and using the dynamic texture stamp to render strokes of digital paint. Accordingly, the digital paintbrush system improves digital painting technology by rendering realistic digital paint strokes consistently and without limits on user inputs such as stroke speed.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes an input device 106 and a display device 108. The computing device 102, the input device 106, and the display device 108 are communicatively coupled via a wired or a wireless connection. For example, the input device 106 may receive an input and communicate the input to the computing device 102 which may process the input as data and render content associated with the input in a user interface 110 of the display device 108. This content can include strokes 112 of digital paint corresponding to a virtual paintbrush stroke input.

The computing device 102 includes a storage device 114 and a digital paintbrush module 116. The storage device is illustrated to include digital content 118 such as strokes 112 of digital paint. The computing device implements 102 the digital paintbrush module 116 to receive inputs from the input device 106. For example, a user may manipulate the input device 106 and the digital paintbrush module 116 may receive inputs corresponding to the manipulation of the input device 106. The digital paintbrush module 116 may process these inputs and cause the display device 108 to display outputs in the user interface 110 that correspond to the processed inputs.

The input device 106 is illustrated as having, receiving, and/or transmitting input data 120. In one example, the input device 106 may be a device such as a touchscreen that has combined functionality of the display device 108 and the input device 106. In another example, the input device 106 can be a device such as a stylus, electronic pen, or a mouse that receives the input data 120, e.g., from a user manipulation, and transmits input data 120, e.g., to the computing device 102. In one embodiment, the input device 106 may include one or more sensors configured to detect input data 120. In another embodiment, the input device 106 can receive input data 120 detected by one or more sensors which can be included in the input device 106 or which can be remote to the input device. For example, the input device 106 may be a stylus that receives input data 120 from a sensor of a stylus pad or from a sensor of the stylus. In another example, the input device 106 may receive input data 120 from one or more sensors via the network 104.

By way of example, the input data 120 can include any data that the digital paintbrush module 116 may use to render strokes 112 of digital paint in the user interface 110. Thus, the input data 120 may include data representative of a property of a brush, a property of a canvas, a property of paint, and/or a property representative of another physical property. In this way, the digital paintbrush module 116 can process the input data 120 to dynamically render strokes 112 of digital paint based on the input data. For example, the input device 106 may be a stylus and the input data 120 may include data describing an orientation of the stylus which the digital paintbrush module 116 can process to render strokes 112 of digital paint based on the orientation of the stylus.

Specifically, different orientations of a physical paintbrush produce physical paint strokes with different features such that a first orientation of the physical paintbrush may produce physical paint strokes having a first feature and a second orientation of the physical paintbrush may produce physical paint strokes having a second feature. Similarly, the digital paintbrush module 116 may receive input data 120 to render strokes 112 of digital paint with different features based on different orientations of the input device 106. In one example, the input data 120 can include data received from the input device 106. In another example, the input data 120 can include data received from another source such as from a user. Thus, the digital paintbrush module 116 may receive input data 120 including data describing a property of paint or a type of paint and the paintbrush module 116 can process this data to render strokes 112 of digital paint based on the paint property or type.

Figure 2:
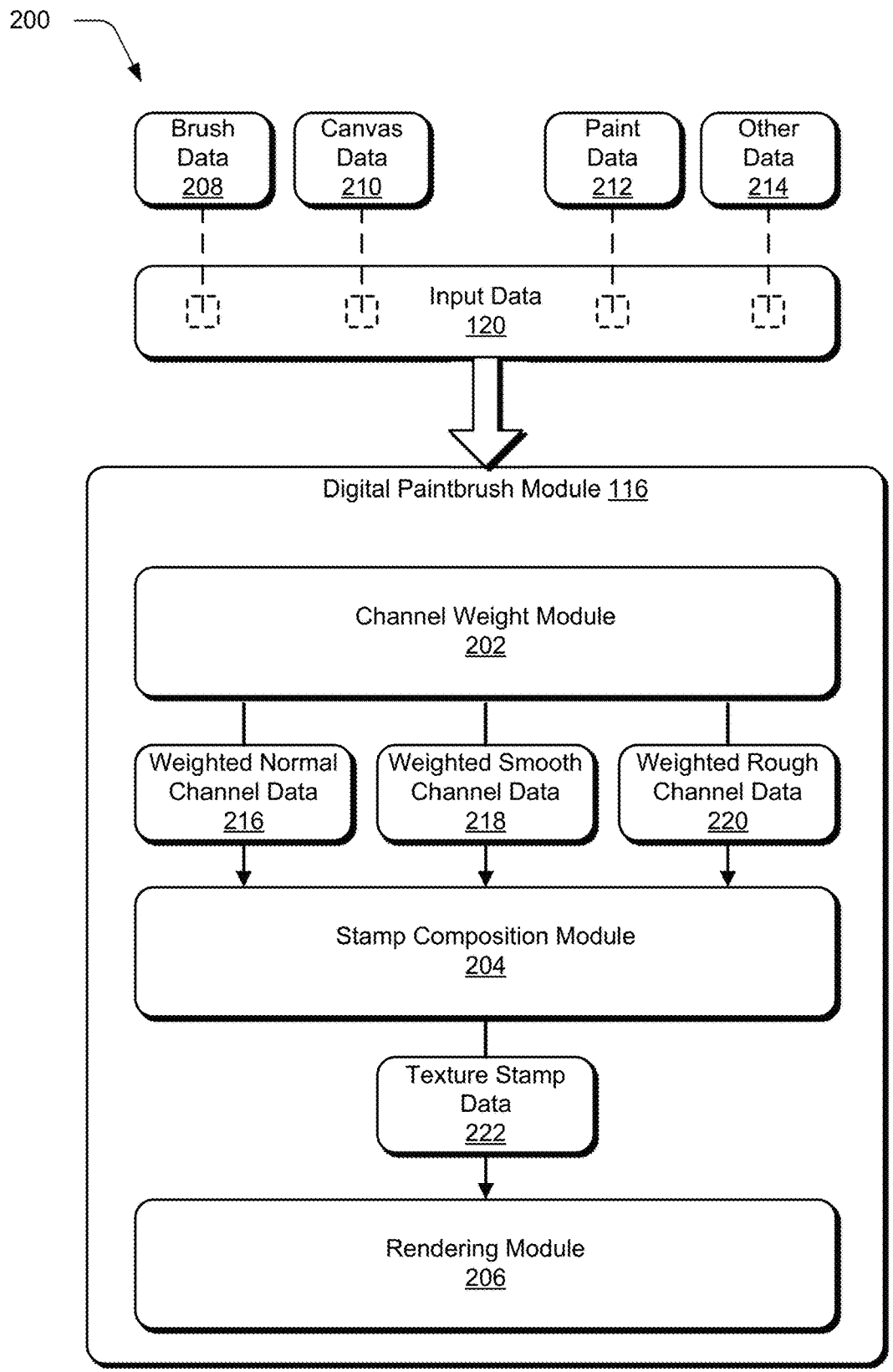
FIG. 2 depicts a system in an example implementation showing operation of a digital paintbrush module.

FIG. 2 depicts a system 200 in an example implementation showing operation of a digital paintbrush module 116. The digital paintbrush module 116 is illustrated to include a channel weight module 202, a stamp composition module 204, and a rendering module 206. The computing device 102 implements the digital paintbrush module 116 to receive inputs, e.g., from the input device 106, and the digital paintbrush module 116 may receive these inputs directly or over the network 104.

The inputs are illustrated as input data 120 which can include brush data 208, canvas data 210, paint data 212, and/or other data 214. The brush data 208 may include stroke data describing stroke properties of a stroke of the input device 106 such as a stroke pressure, a stroke velocity, a stroke direction, and/or a stroke orientation. The canvas data 210 may include data describing properties of a virtual canvas such as canvas texture or canvas material, and the paint data 212 can include data describing properties of virtual paint such as moisture content (wetness) or paint type. The other data 214 may include user preference data or any other data that may be processed to render strokes 112 of digital paint.

The channel weight module 202 is implemented to determine weights to apply to texture image channels based on inputs received from the input device 106. For example, the channel weight module 202 may determine the weights to apply to the texture image channels based on the input data 120, and the texture image channels can each represent an attribute of a digital paintbrush such as a normal, smooth, or rough version of a stamp texture of the digital paintbrush. In this way, the weights can define a significance of the individual attribute represented by each texture image channel based on the input data 120. Thus, the channel weight module 202 determines the weights to apply to the texture image channels based on the stroke property and applies the determined weights to the texture image channels.

As shown in FIG. 2, the texture image channels with the applied weights are represented as weighted normal channel data 216, weighted smooth channel data 218, and weighted rough channel data 220. In particular, the channel weight module 202 generates the weighted normal channel data 216, the weighted smooth channel data 216, and the weighted rough channel data 220 dynamically and in response to receiving the input data 120.

The stamp composition module 204 is implemented to generate a texture stamp of the digital paintbrush by combining the weighted texture image channels, and a rendering module 206 is implemented to render the generated texture stamp as digital paint in the user interface 110 of the display device 108. Thus, the stamp composition module 204 receives the weighted normal channel data 216, the weighted smooth channel data 218, and the weighted rough channel data 220, and the stamp composition module 204 generates a texture stamp in real-time based on the received weighted channel data. The generated texture stamp is represented by texture stamp data 222 which is received by the rendering module 206. The rendering module 206 renders the received texture stamp data 222 as strokes 112 of digital paint in the user interface 110.

Thus, by applying the weights to the texture image channels, a relative significance of the attributes represented by the texture image channels is dynamically reflected in the generated texture stamp of the digital paintbrush. As the rendering module 206 uses the generated texture stamp to render strokes 112 of digital paint in the user interface 110, the relative significance of the attributes represented by the texture image channels is also dynamically reflected in the rendered strokes 112 of digital paint. Unlike conventional systems which use a static stamp texture pattern to render digital paintbrush strokes, the systems and techniques described use a dynamic stamp texture pattern that changes in real-time based on received input data 120.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which an attribute of a digital paintbrush is adjusted based on at least one stroke property of a stroke of the digital paintbrush. An input is received describing at least one stroke property of a stroke of a digital paintbrush (block 302). For example, the digital paintbrush module 116 may receive input data 120 from the input device 106 in response to a user's manipulation of the input device 106. The user's manipulation of the input device 106 may be similar to a manipulation of a physical paintbrush such as manipulating the input device 106 in a stroking motion. Thus, the described systems and techniques are intuitive to the user and do not require significant training as in conventional bristle simulation paint systems.

A weight is determined to apply to a texture image channel based on the at least one stroke property (block 304). In one or more embodiments, the channel weight module 202 may determine the weight to apply to the texture image channel based on a feature of the at least one stroke property described in the input data 120, and the texture image channel represents an attribute of the digital paintbrush. In this way, a significance of the attribute may be defined by a magnitude of the weight applied to the texture image channel, and this significance may be determined by the channel weight module 202 based on the input data 120.

The attribute is adjusted by applying the weight to the texture image channel (block 306). For example, the channel weight module 202 may apply the weight to the texture image channel to adjust the significance of the attribute based on the received input data 120 from the input device 106. Specifically, the significance of the attribute can be adjusted dynamically as the input data 120 is received in real-time without imposing limits on inputs such as limiting stroke speed.

A texture stamp is generated of the digital paintbrush by combining the texture image channel with at least one additional texture image channel representing an additional attribute of the digital paintbrush (block 308). In one example, the stamp composition module 204 may generate the texture stamp as texture stamp data 222. Thus, the stamp composition module 204 may generate the texture stamp data 222 by combining the weighted normal channel data 216, the weighted smooth channel data 218, and the weighted rough channel data 220. In one or more implementations, the stamp composition module 204 may dynamically generate the texture stamp data 222 by combining the texture image channels in real-time as the input data 120 is received and as the significance of the attribute is adjusted by the channel weight module 202.

The stroke is rendered for display in a user interface using the generated texture stamp (310), and the applied weight defines a significance of the attribute relative to the additional attribute of the digital paintbrush based on the received input from the input device 106. For example, the rendering module 206 may receive the texture stamp data 222 and render the stroke 112 of digital paint based on the received texture stamp data 222.

Example Illustration

Figure 4:
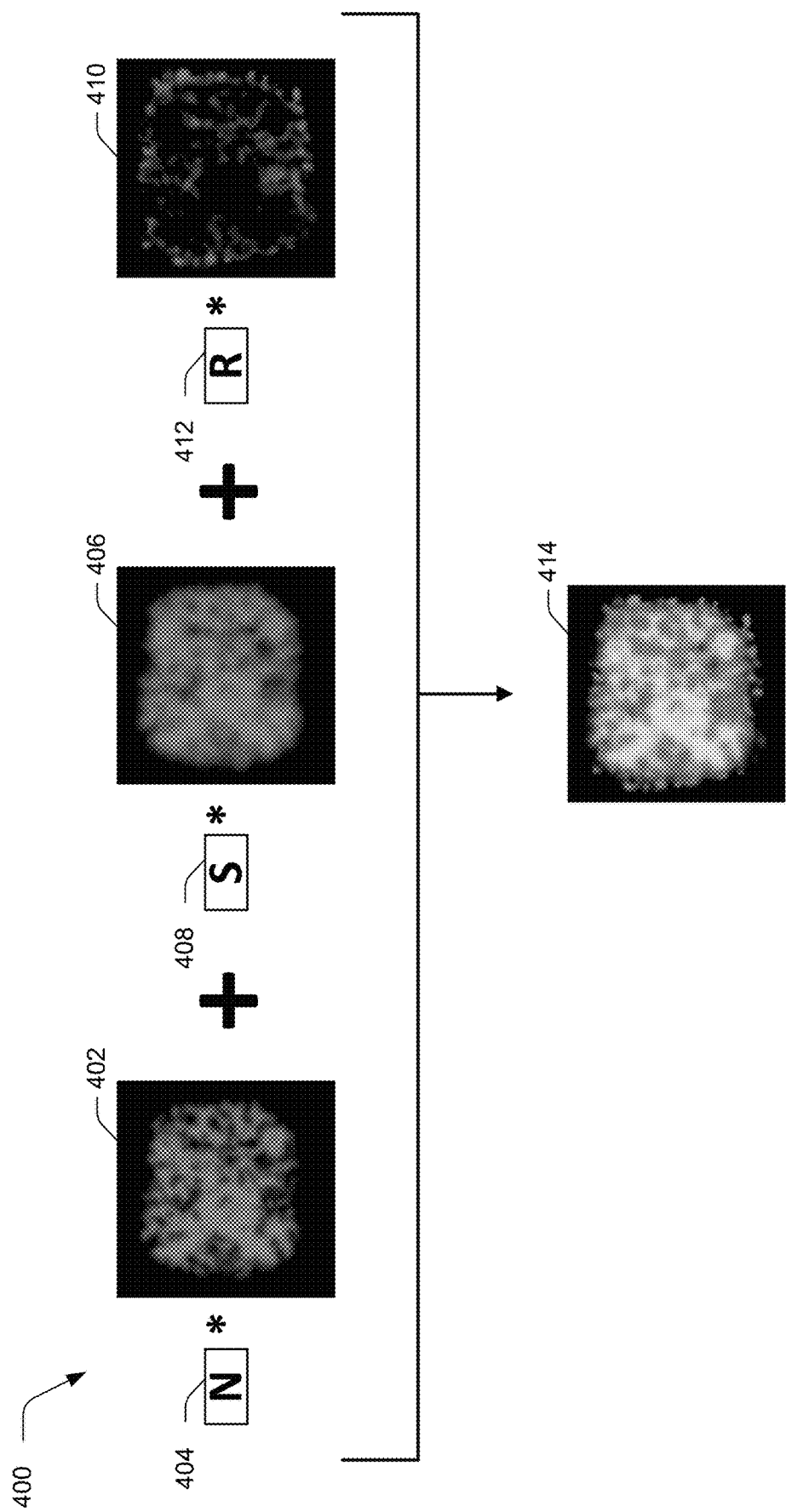
FIG. 4 is an illustration depicting a representation of dynamic generation of a texture stamp of a digital paintbrush.

FIG. 4 is an illustration depicting a representation 400 of dynamic generation of a texture stamp of a digital paintbrush. The representation 400 includes a first texture image channel 402 representing a normal attribute of a brush stamp. A first weight 404 is applied to the first texture image channel 402 meaning that the first weight 404 defines a relative significance of the normal attribute of the brush stamp. The representation 400 also includes a second texture image channel 406 representing a smooth attribute of the brush stamp. A second weight 408 is applied to the second texture image channel 406, and this second weight 408 defines a relative significance of the smooth attribute of the brush stamp, e.g., as compared to the normal attribute of the brush stamp. A third texture image channel 410 represents a rough attribute of the brush stamp, and a third weight 412 is applied to the third texture image channel 410. The texture stamp 414 is generated by combining the three texture image channels. In this way, the texture stamp 414 is generated as the weighted average of the three texture image channels.

Thus, the digital paintbrush module 116 is implemented to render a digital paintbrush stroke using the texture stamp 414 which includes the combined texture image channels. In one or more implementations, weights 404, 408, and 412 are dynamically adjusted in response to received input data 120 describing one or more properties of the stroke. The texture stamp 414 can also be generated dynamically as the weights are adjusted in real-time. Accordingly, the digital paintbrush module 116 is implemented to dynamically render the digital paintbrush stroke in real-time and without imposing limitations on stroke inputs such as a maximum stoke speed.

Although the three texture image channels are described in terms of representing a normal, a smooth, and a rough version of a brush stamp, the systems and techniques described herein are not limited to such representations. For example, one or more of the texture image channels or the weights applied to the texture image channels may be modified to provide additional or alternative functionality. In one example, such a modification may be employed to simulate properties of physical paint such as paint wetness or paint viscosity. In another example, such modification may be employed to simulate properties of a physical canvas such as canvas texture or canvas porosity. Furthermore, the systems and techniques described are not limited to representations or simulations of features of physical painting. Thus, the texture image channels or the weights applied to the channels may be modified to provide arbitrary or artistic functionality. In this way, the described systems and techniques improve digital painting technology by enabling customization of the dynamic texture stamp 414. Unlike conventional systems which are limited to a static stamp texture pattern or individual bristle simulation, the techniques described herein are both robust and flexible and can be modified to provide augmented or additional functionality.

In one example, the three texture image channels may be RGB channels where each of the RGB channels represents a principal aspect of the texture stamp 414. For example, the first texture image channel 402 may be a red RGB channel, the second texture image channel 406 may be a green RGB channel, and the third texture image channel 410 may be a blue RGB channel In this way, the systems and techniques described herein may be implemented to provide paint simulation functionality without the computational cost of three-dimensional paintbrush simulation. Additionally, using existing RGB channels for the texture image channels allows the systems and techniques described to be implemented in existing digital painting systems without requiring significant modification of the existing digital painting systems. Thus, unlike conventional bristle simulation digital paint systems which have limited interoperability with other systems, the described techniques utilize existing RGB channels to provide dynamic digital paint simulation functionality which is compatible with existing digital paint systems.

Figure 5:
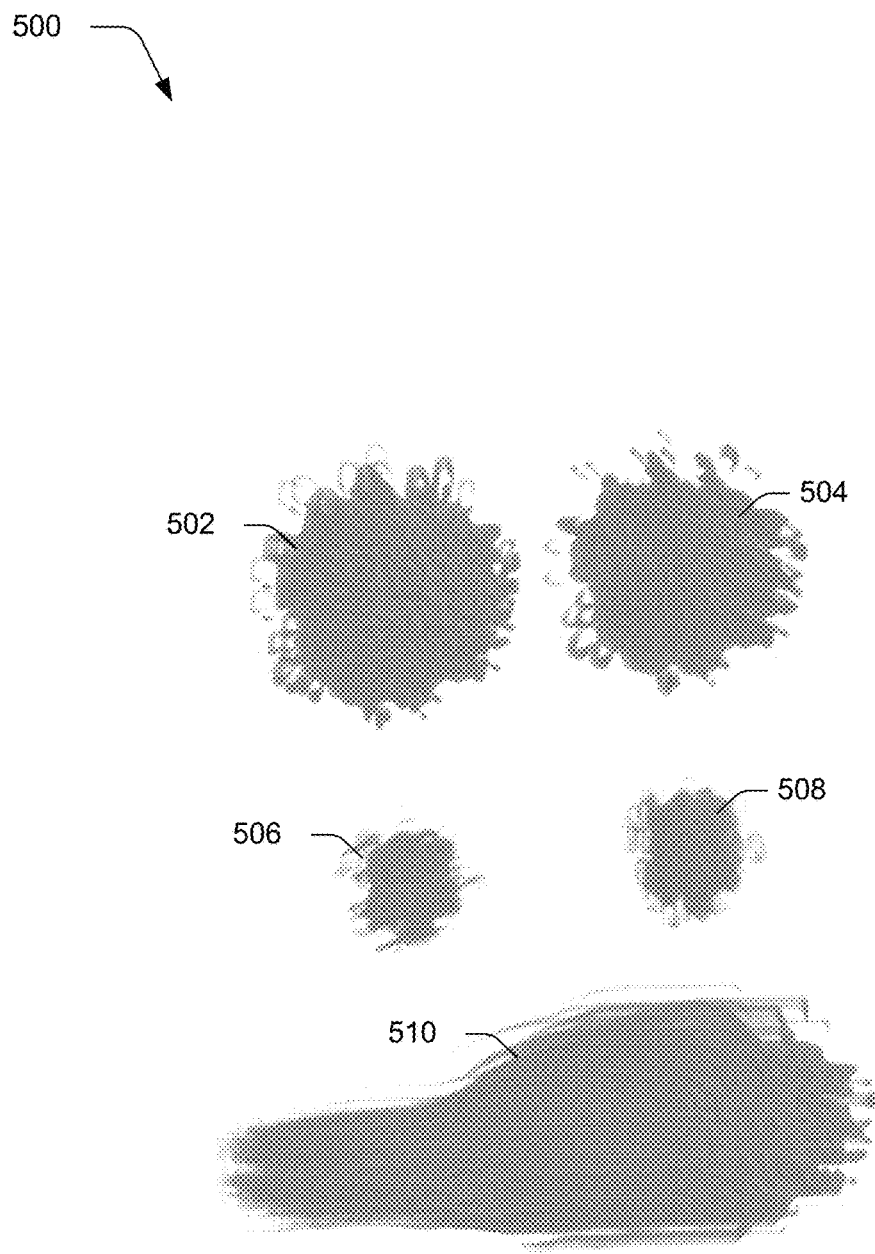
FIG. 5 is an illustration depicting an example representation of rendered strokes of a digital paintbrush in response to receiving a stroke pressure property.

FIG. 5 is an illustration depicting an example representation 500 of rendered strokes of a digital paintbrush in response to receiving a stroke pressure property. In this example, weights 404, 408, and 412 may be defined and dynamically adjusted accordingly:

$$N=0.5$$

$$S=0.1$$

$$R=p_i$$

where: N is the first weight 404 that is applied to the first texture image channel 402 which represents a normal attribute of a paintbrush stroke; S is the second weight 408 that is applied to the second texture image channel 406 which represents a smooth attribute of the paintbrush stroke; R is the third weight 412 that is applied to the third texture image channel 410 which represents a rough attribute of the paintbrush stroke; and $p_i$ is a stroke pressure property which is received from the input device 106. For example, the input device 106 may include one or more sensors that may detect a force applied to a portion of the input device 106 and $p_i$ can reflect a magnitude of this force.

When a pressure is applied to a physical paintbrush, the applied pressure tends to cause the bristles to split apart. In other words, a conventional paintbrush typically includes a handle to manipulate the brush, bristles to transfer paint or ink from a container or palette to a canvas or substrate, and a mechanism for attaching the bristles to the handle such as a ferrule or a crimp. As the bristles are pressed against the canvas or substrate, the bristles deform laterally relative to the canvas or substrate which causes the bristles to separate or split apart.

To reflect this bristle splitting feature, a greater weight is applied to the third texture image channel 410 which represents the rough attribute of the paintbrush stroke. As shown in FIG. 5, stroke rendering 502 and stroke rendering 504 are example renderings in response to applying relatively high pressure to the input device 106. In contrast, stroke rendering 506 and stroke rendering 508 are example renderings in response to applying a relatively low pressure to the input device 106. Additionally, stroke rendering 510 is an example rendering of a paintbrush stroke in response to a variable pressure applied to the input device 106. As shown in FIG. 5, the pressure applied to the input device 106 transitions from a relatively low pressure to a relatively high pressure which is illustrated by an increase in the rough attribute in the stroke rendering 510.

Figure 6:
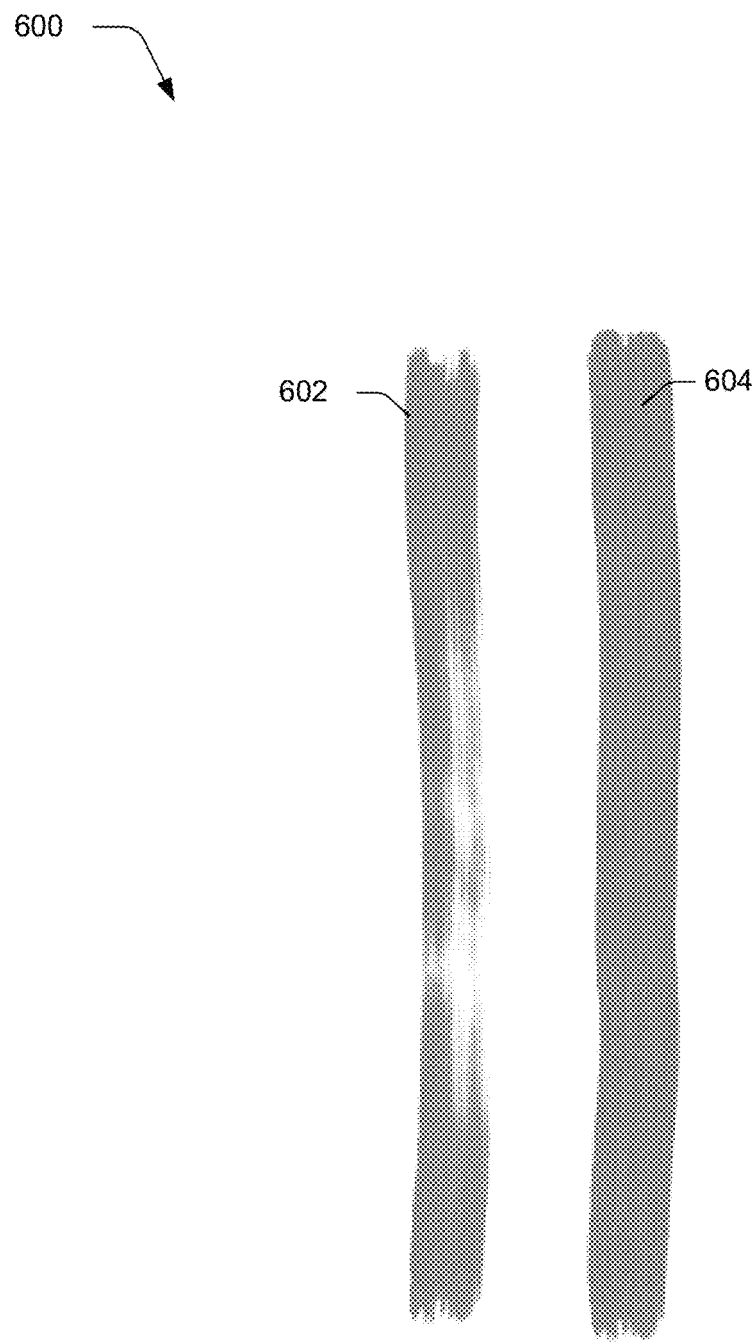
FIG. 6 is an illustration depicting an example representation of rendered strokes of a digital paintbrush in response to receiving a stroke velocity property.

FIG. 6 is an illustration depicting an example representation 600 of rendered strokes of a digital paintbrush in response to receiving a stroke velocity property. In this example, weights 404, 408, and 412 may be defined and dynamically adjusted accordingly:

$$N=0.5$$

$$S=1.0-\text{scale}*|V|$$

$$R=\text{scale}*|V|$$

where: N is the first weight 404 that is applied to the first texture image channel 402 which represents the normal attribute of a paintbrush stroke; S is the second weight 408 that is applied to the second texture image channel 406 which represents the smooth attribute of the paintbrush stroke; R is the third weight 412 that is applied to the third texture image channel 410 which represents the rough attribute of the paintbrush stroke; and V is a two-dimensional vector denoting a stroke velocity at a stamping point which is received from the input device 106. For example, the input device 106 may include one or more sensors that may detect a velocity of the input device 106.

When a velocity is applied to a physical paintbrush, a faster stroke tends to be rougher and a slower stroke tends to be smoother. To reflect this velocity feature, a greater weight is applied to the third texture image channel 410 and a smaller weight is applied the second texture image channel 406 when a high velocity is applied to the input device 106, and a smaller weight is applied to the third texture image channel 410 and a greater weight is applied the second texture image channel 406 when a low velocity is applied to the input device 106. As shown in FIG. 6, stroke rendering 602 is an example rendering of a relatively fast paintbrush stroke and stroke rendering 604 is an example rendering of a relatively slow paintbrush stroke.

Figure 7:
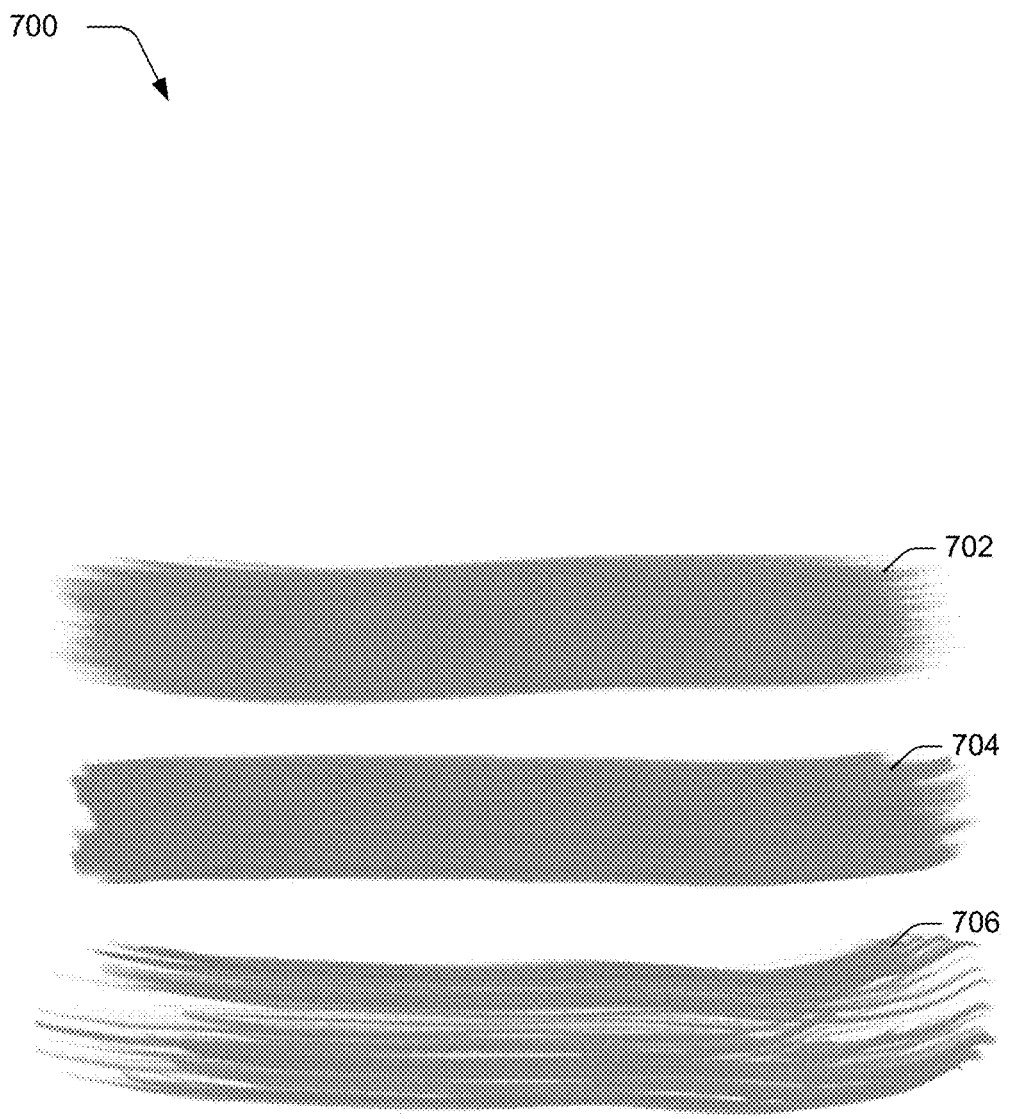
FIG. 7 is an illustration depicting an example representation of rendered strokes of a digital paintbrush in response to receiving a stroke direction property and an orientation associated with an input device.

FIG. 7 is an illustration depicting an example representation 700 of rendered strokes of a digital paintbrush in response to receiving a stroke direction property and an orientation associated with an input device. In this example, weights 404, 408, and 412 may be defined and dynamically adjusted accordingly:

$$N=0.5$$

$$S=\text{scale}*(1.0+\text{dot}(V,T))$$

$$R=1.0-\text{scale}*(1.0+\text{dot}(V,T))$$

$$T=(\text{tilt}X,\text{tilt}Y)$$

where: N is the first weight 404 that is applied to the first texture image channel 402 which represents a normal attribute of a paintbrush stroke; S is the second weight 408 that is applied to the second texture image channel 406 which represents the smooth attribute of the paintbrush stroke; R is the third weight 412 that is applied to the third texture image channel 410 which represents the rough attribute of the paintbrush stroke; V is a two-dimensional vector denoting a stroke velocity at a stamping point which is received from the input device 106; tiltX describes an orientation of the input device 106 relative to an x-axis at the stamping point; and tiltY describes an orientation of the input device 106 relative to a y-axis at the stamping point. For example, the input device 106 may include one or more sensors that may detect a velocity of the input device 106 and an orientation of the input device 106.

When a physical paintbrush is tilted, a stroke of the tilted paintbrush along a natural direction of its bristles tends to be smoother and a stroke against the natural bristle direction tends to be rougher due to bristle splitting. Additionally, as discussed above, a faster stroke is generally rougher in appearance and a slower stroke is generally smoother in appearance. To reflect this tilting feature, a greater weight is applied to the third texture image channel 410 and a lower weight is applied to the second texture image channel 406 when an orientation of the input device 106 and a stroke direction is against a direction of virtual bristles to produce a rougher appearing stroke. Additionally, a lower weight is applied to the third texture image channel 410 and a greater weight is applied to the second texture image channel 406 when an orientation of the input device 106 and a stroke direction is with a direction of virtual bristles to produce a smoother appearing stroke. As shown in FIG. 7, stroke rendering 702 is an example rendering of a stroke in a direction that is not with or against virtual bristles meaning that the input device 106 is normal to a virtual canvas. Stroke rendering 704 is an example rendering of a stroke in a direction that is with a natural direction of the virtual bristles and stroke rendering 706 is an example rendering of a stroke in a direction that is against the natural direction of the virtual bristles. Thus as illustrated in FIG. 7, stroke rendering 704 is smoother in appearance than stroke rendering 702 and stroke rendering 706 is rougher in appearance than stroke rendering 702.

Example System and Device

Figure 8:
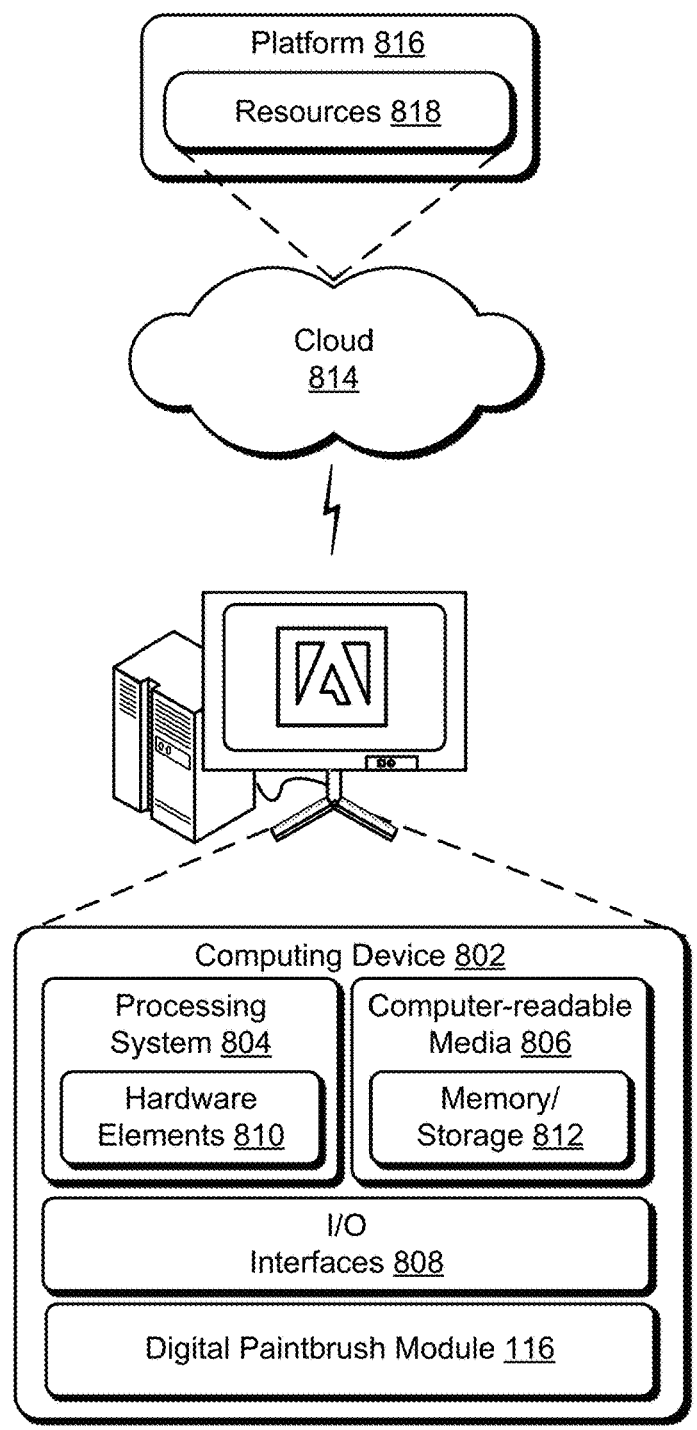
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the digital paintbrush module 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the implementation of dynamic texture for a digital paintbrush have been described in language specific to structural features and/or methods, it is to be understood that the appended claims are not necessarily limited to the specific features or methods described. Rather, the specific features and methods are disclosed as example implementations of dynamic texture for a digital paintbrush, and other equivalent features and methods are intended to be within the scope of the appended claims. Further, various different examples are described and it is to be appreciated that each described example can be implemented independently or in connection with one or more other described examples.

What is claimed is:

1. In a digital medium environment to dynamically adjust texture of a digital paintbrush, a method implemented by at least one computing device, the method comprising:

receiving, by the at least one computing device, input data describing at least one stroke property of a stroke of the digital paintbrush;

determining, by the at least one computing device, a weight to apply to a red RGB channel based on the at least one stroke property, the red RGB channel representing an attribute of the digital paintbrush;

dynamically adjusting, by the at least one computing device, the attribute of the digital paintbrush by applying the weight to the red RGB channel;

generating, by the at least one computing device, a texture stamp of the digital paintbrush by combining the red RGB channel with at least one additional RGB channel representing an additional attribute of the digital paintbrush;

changing, by the at least one computing device, a pattern of the texture stamp based on the input data; and rendering, by the at least one computing device, the stroke for display in a user interface using the pattern of the texture stamp.

2. The method as described in claim 1, wherein the at least one stroke property is one of a stroke pressure or an orientation associated with a user input.

3. The method as described in claim 2, wherein the orientation associated with the user input is an orientation of a stylus.

4. The method as described in claim 1, further comprising:
determining an additional weight to apply to the at least one additional RGB channel; and
dynamically adjusting the additional attribute of the digital paintbrush by applying the additional weight to the at least one additional RGB channel.

5. The method as described in claim 1, wherein the attribute is one of normal, smooth, or rough.

6. The method as described in claim 1, wherein the weight defines a significance of the attribute relative to the additional attribute in the pattern of the texture stamp based on the at least one stroke property of the stroke.

7. The method as described in claim 1, wherein the at least one stroke property is a stroke velocity at a stamping point of the digital paintbrush.

8. In a digital medium environment to dynamically adjust texture of a digital paintbrush, modules implemented at least partially in hardware of one or more computing devices of a system comprising:
a channel weight module implemented to:
determine a first weight to apply to a blue RGB channel and a second weight to apply to an additional RGB channel based on input data describing at least one stroke property of a stroke of the digital paintbrush, the blue and the additional RGB channels each representing an attribute of the digital paintbrush; and
adjust a significance of each of the attributes based on the at least one stroke property by applying the determined first and second weights to the blue and the additional RGB channels; and
a stamp composition module implemented to:
generate a texture stamp of the digital paintbrush by combining the blue and the additional RGB channels; and
change a pattern of the texture stamp based on the input data.

9. The system as described in claim 8, wherein the at least one stroke property is one of a stroke pressure or an orientation associated with a user input.

10. The system as described in claim 9, wherein the orientation associated with the user input is an orientation of a stylus.

11. The system as described in claim 8, further comprising a rendering module implemented to render the stroke for display in a user interface using the pattern of the texture stamp.

12. One or more computer-readable storage media comprising instructions stored thereon that, responsive to execution by a computing device in a digital medium environment to dynamically adjust texture of a digital paintbrush, cause operations of the computing device including:
receiving input data describing at least one stroke property of a stroke of the digital paintbrush;
determining a weight to apply to a green RGB channel based on the at least one stroke property, the green RGB channel representing an attribute of the digital paintbrush;
dynamically adjusting the attribute of the digital paintbrush by applying the weight to the green RGB channel;
generating a texture stamp of the digital paintbrush by combining the green RGB channel with an additional RGB channel representing an additional attribute of the digital paintbrush; and
changing a pattern of the texture stamp based on the input data.

13. The one or more computer-readable storage media as described in claim 12, wherein the at least one stroke property is one of a stroke pressure or an orientation associated with a user input.

14. The one or more computer-readable storage media as described in claim 13, wherein the orientation associated with the user input is an orientation of a stylus.

15. The one or more computer-readable storage media as described in claim 12, wherein the at least one stroke property is one of a stroke velocity or a stroke direction.

16. The one or more computer-readable storage media as described in claim 12, the operations further including:
determining an additional weight to apply to the additional RGB channel; and
dynamically adjusting the additional attribute of the digital paintbrush by applying the additional weight to the additional RGB channel.

17. The one or more computer-readable storage media as described in claim 12, the operations further including rendering the stroke for display in a user interface using the pattern of the texture stamp.

18. The one or more computer-readable storage media as described in claim 12, wherein the attribute is one of normal, smooth, or rough.

19. The one or more computer-readable storage media as described in claim 12, wherein the weight defines a significance of the attribute relative to the additional attribute in the texture stamp based on the at least one stroke property of the stroke.

20. The one or more computer-readable storage media as described in claim 12, wherein the at least one stroke property is a stroke velocity at a stamping point of the digital paintbrush.

* * * * *